(12) United States Patent
Liu

(10) Patent No.: US 10,198,083 B2
(45) Date of Patent: Feb. 5, 2019

(54) HAND GESTURE RECOGNITION METHOD, DEVICE, SYSTEM, AND COMPUTER STORAGE MEDIUM

(71) Applicant: ZTE Corporation, Shenzhen, Guangdong (CN)

(72) Inventor: Haijun Liu, Shenzhen (CN)

(73) Assignee: XI'AN ZHONGXING NEW SOFTWARE CO. LTD., Xi'an (CN)

( * ) Notice: Subject to any disclaimer, the term of this patent is extended or adjusted under 35 U.S.C. 154(b) by 93 days.

(21) Appl. No.: 15/121,592

(22) PCT Filed: Oct. 22, 2014

(86) PCT No.: PCT/CN2014/089167
§ 371 (c)(1),
(2) Date: Aug. 25, 2016

(87) PCT Pub. No.: WO2015/127786
PCT Pub. Date: Sep. 3, 2015

(65) Prior Publication Data
US 2017/0277267 A1    Sep. 28, 2017

(30) Foreign Application Priority Data
Feb. 25, 2014    (CN) .......................... 2014 1 0065540

(51) Int. Cl.
*G06F 3/01*        (2006.01)
*G06F 3/00*        (2006.01)
(Continued)

(52) U.S. Cl.
CPC .............. *G06F 3/017* (2013.01); *G06F 3/005* (2013.01); *G06F 3/011* (2013.01); *G06F 13/38* (2013.01);
(Continued)

(58) Field of Classification Search
CPC ......... G06K 9/00355; G06K 9/78; G06K 9/52
See application file for complete search history.

(56) References Cited

U.S. PATENT DOCUMENTS 9,721,566 B2 *   8/2017   Newendorp ............ G10L 15/32
9,778,747 B2 *  10/2017   Praphul ................... G06F 3/017
(Continued)

FOREIGN PATENT DOCUMENTS

CN        101667089 A      3/2010
CN        102096469 A      6/2011
(Continued)

OTHER PUBLICATIONS

International Search Report in international application No. PCT/CN2014/089167, dated Jan. 28, 2015, 2 pgs.
(Continued)

*Primary Examiner* — Dino Kujundzic
(74) *Attorney, Agent, or Firm* — Cooper Legal Group, LLC

(57) ABSTRACT

The embodiments of the present invention disclose a hand gesture recognition method, device, and system; the hand gesture recognition method disclosed in the present invention comprising: a first hand gesture recognition device determining, according to a recognized hand gesture and the position thereof, as well as said hand gesture and the position thereof as recognized by a second hand gesture recognition device, whether to accept control by said hand gesture. Another hand gesture recognition method disclosed by the present invention comprises: a first hand gesture recognition device publishing information of a hand gesture it has recognized, and receiving information of said hand gesture recognized by a second hand gesture recognition device.

15 Claims, 4 Drawing Sheets

(51) Int. Cl.
　　　*H04L 12/28* (2006.01)
　　　*G06F 13/38* (2006.01)
　　　*G06K 9/00* (2006.01)

(52) U.S. Cl.
　　　CPC ...... *G06K 9/00355* (2013.01); *H04L 12/2803* (2013.01)

(56) References Cited

U.S. PATENT DOCUMENTS

| | | | |
|---|---|---|---|
| 2007/0066323 A1* | 3/2007 | Park | G01S 5/02 455/456.2 |
| 2013/0229508 A1 | 9/2013 | Li et al. | |
| 2013/0328763 A1* | 12/2013 | Latta | G06F 3/017 345/156 |
| 2014/0157209 A1* | 6/2014 | Dalal | G06F 3/017 715/863 |
| 2015/0304712 A1 | 10/2015 | Liu | |
| 2015/0346834 A1* | 12/2015 | Martinez Fernandez | G06F 3/017 340/12.5 |
| 2015/0355719 A1* | 12/2015 | Suman | G06F 3/014 345/156 |
| 2016/0291696 A1* | 10/2016 | Rider | G06F 3/1454 |
| 2017/0344813 A1* | 11/2017 | Lu | G06K 9/00201 |
| 2017/0344814 A1* | 11/2017 | Tsai | G06K 9/00355 |

FOREIGN PATENT DOCUMENTS

| | | |
|---|---|---|
| CN | 102625173 A | 8/2012 |
| CN | 102662462 A | 9/2012 |
| CN | 102722321 A | 10/2012 |
| CN | 102799355 A | 11/2012 |
| CN | 102866777 A | 1/2013 |
| CN | 102929508 A | 2/2013 |
| CN | 102984592 A | 3/2013 |
| CN | 103294374 A | 9/2013 |
| CN | 103329066 A | 9/2013 |
| CN | 103455136 A | 12/2013 |
| CN | 103488406 A | 1/2014 |
| CN | 103543926 A | 1/2014 |
| CN | 103576966 A | 2/2014 |
| CN | 103577793 A | 2/2014 |
| CN | 103677591 A | 3/2014 |
| EP | 2930937 A1 | 10/2015 |

OTHER PUBLICATIONS

English Translation of the Written Opinion of the International Search Authority in international application No. PCT/CN2014/089167, dated Jan. 28, 2015, 10 pgs.

Supplementary European Search Report in European application No. 14883571.3, dated Feb. 8, 2017, 10 pgs.

* cited by examiner

A first gesture recognition device determines, according to information of a gesture recognized by the first gesture recognition device and information of the gesture recognized by a second gesture recognition device, whether to accept control by the gesture Fig. 2
A first gesture recognition device publishes information of a gesture recognized by the first gesture recognition device, and receives information of the gesture recognized by a second gesture recognition device
Fig. 3
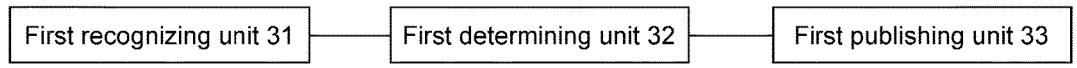
Fig. 4
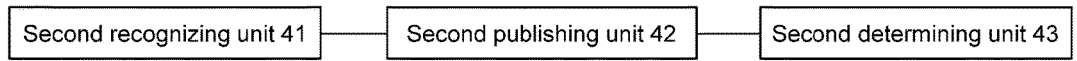

HAND GESTURE RECOGNITION METHOD, DEVICE, SYSTEM, AND COMPUTER STORAGE MEDIUM

TECHNICAL FIELD

The disclosure relates to gesture recognition techniques in the field of communications and information, and particularly to gesture recognition methods and devices, a gesture recognition system and a computer storage medium.

BACKGROUND

With the development of digital multimedia and networks, entertainment experiences of users in daily life are enriched and operations of home appliances are facilitated. Existing techniques enable users at home to enjoy high-definition TV programs from a digital optical disk, a cable television, the Internet and the like. Stereo, 5.1 acoustic channel, 7.1 acoustic channel and even more vivid sound effect may be experienced. Moreover, the users are able to implement these experiences by using hand-held multimedia electronic devices, tablet computers (PADs) or mobile phones. The related art also includes that a user is able to transfer a digital content between different devices through a network so as to play the transferred content, and to control playing on a device through a remote control or a gesture, e.g. the user is able to control a switch from a program of a previous channel to a next channel, and to operate an air conditioner or a lamp so as to control the temperature or dim the lights, respectively.

In the related art, for controlling multiple devices, generally a user may control devices using their respective remote controllers, but these remote controllers are not universal, and most of these controllers for devices such as a traditional TV set or sound box, are not network enabled. There may be some network enabled remote controls, e.g., a device (e.g., a mobile phone, a PAD) having computing and networking capabilities may be loaded with software supporting intercommunication protocols to control another device.

With the development of techniques, there are increasing demands for sharing and transferring content being played between multiple devices, thus it is required to manipulate many home appliances respectively, and ways of manipulation include: a user needs to select a remote control corresponding to a specific device from a number of remote controllers to control different devices, and thus the user needs to change remote controllers from time to time; the device can be controlled through operations on a pad or a mobile phone by people familiar with basic operations on computers, or a single device is controlled by a simple gesture.

It can be seen that in order to use different devices, it is usually necessary to learn to use different manipulation tools. A user prefers to control more devices in a small range by using a simpler and more natural operation method.

At present, gesture control is a relatively novel manipulation technology. A camera on a device monitors a gesture, analyzes and recognizes the monitored gesture, converts the recognized gesture into control instructions for the device and executes the instructions; or a user uses a wearable device, and wears a device like a ring, a watch, a vest and the like on a hand, an arm and the body so that the device recognizes an action of the user, converts the same into control instructions for the device and execute the instructions.

The related art enables a user to use a gesture to manipulate a device. For example, a camera is added on a television so as to acquire and recognize a gesture of a user, an instruction corresponding to an acquired gesture is determined according to correspondences between gestures and control instructions, and the determined instruction is executed. Achieved manipulations include change of a channel, change of a volume and so on.

However, it is required in the related art that a manipulated device is provided with a camera so as to acquire a gesture. Usually, many devices are gathered in some environments, such as a home environment. A camera for recognizing a gesture may be integrated on these devices. When using a gesture to control a device, a user needs to face a camera of a device to be manipulated so as to make a control action. If a plurality of devices needs to be manipulated, the user needs to move among different devices, so as to make gestures for manipulating the devices, thus resulting in cumbersome and time-consuming operations, and user experiences are affected.

There is yet no effective solution for helping a user to use gestures to manipulate a plurality of devices rapidly and conveniently in the related art.

SUMMARY

Embodiments of the disclosure provide a gesture recognition method, device and system, and a computer storage medium, so as to enable the gesture recognition device to rapidly determine whether to accept control by a gesture made by a user, thus enabling a target manipulated device to respond rapidly to the gesture.

An embodiment of the disclosure provides a gesture recognition method, including:

a first gesture recognition device determines, according to information of a gesture recognized by the first gesture recognition device and information of the gesture recognized by a second gesture recognition device, whether to accept control by the gesture.

An embodiment of the disclosure further provides a gesture recognition method, including:

a first gesture recognition device publishes information of a gesture recognized by the first gesture recognition device, and receives information of the gesture recognized by a second gesture recognition device.

An embodiment of the disclosure further provides a first gesture recognition device, including:

a first recognizing unit configured to recognize information of a gesture; and a first determining unit configured to determine, according to the information of the gesture recognized by the first recognizing unit and information of the gesture provided by a second gesture recognition device, whether to accept control by the gesture.

An embodiment of the disclosure further provides a first gesture recognition device, including: a second recognizing unit and a second publishing unit, in which:

the second publishing unit is configured to publish, in a network, information of a gesture recognized by the second recognizing unit, and receive information of the gesture provided by a second gesture recognition device.

An embodiment of the disclosure further provides a gesture recognition system, including at least one of the gesture recognition devices above.

An embodiment of the disclosure further provides a computer storage medium having stored therein computer executable instructions used for executing any one of the gesture recognition methods above.

In the technical solutions of the embodiments of the disclosure, a first gesture recognition device may be arranged in a plurality of devices to be manipulated, thus, in a scenario where there are a plurality of devices to be manipulated, the first gesture recognition device may determine, according to information of a gesture recognized by the first gesture recognition device and information of the gesture recognized by the second gesture recognition device, whether to accept control by the gesture. The recognition method according to the present disclosure is more automatic and more user-friendly, which accords with a usage habit of a user, and facilitates the user to use a gesture to manipulate a device.

BRIEF DESCRIPTION OF THE DRAWINGS

FIG. 2 is a second schematic diagram of a gesture recognition method in an embodiment of the disclosure;

FIG. 3 is a first schematic diagram of components of a first gesture recognition device in an embodiment of the disclosure;

FIG. 4 is a second schematic diagram of components of a first gesture recognition device in an embodiment of the disclosure;

DETAILED DESCRIPTION

During an implementation process of the disclosure, the inventors found that, by transmitting control information between different devices through a network, there is already a related technology capable of implementing mutual discovery and control between the devices. For example, a Universal Plug and Play (UPnP) technology specifies methods for sending and receiving network messages between devices so as to implement discovery and control between the devices. The technology uses a network device and a numeric code as a device identifier which is a machine identifier, and a user needs to perform selection according to a machine identifier of a device before operation during final control. If a gesture identifier method, device and system can be provided so as to enable the user to manipulate a plurality of devices more simply and conveniently and help implementing coordinated gesture control, the user will have a more relax and enjoyable entertainment life, and does not need to learn to master more usage methods. In addition, it is also helpful for enterprises to produce products more well-received by customers.

In an embodiment of the disclosure, a first gesture recognition device determines, according to a recognized gesture and the position of the gesture, and the gesture recognized by a second gesture recognition device and the position of the gesture, whether to accept control by the gesture.

A first gesture recognition device and a second gesture recognition device recorded in an embodiment of the disclosure are gesture recognition devices for implementing the same functions. During practical application, the first gesture recognition device and the second gesture recognition device may be arranged in a plurality of devices to be manipulated. In order to facilitate description, a gesture recognition device arranged in one of the devices is described as the first gesture recognition device while a gesture recognition device arranged in another device is described as the second gesture recognition device. In other words, there is at least one second gesture recognition device.

The disclosure will be further expounded below in combination with the accompanying drawings and embodiments.

Figures 1A, 1B:
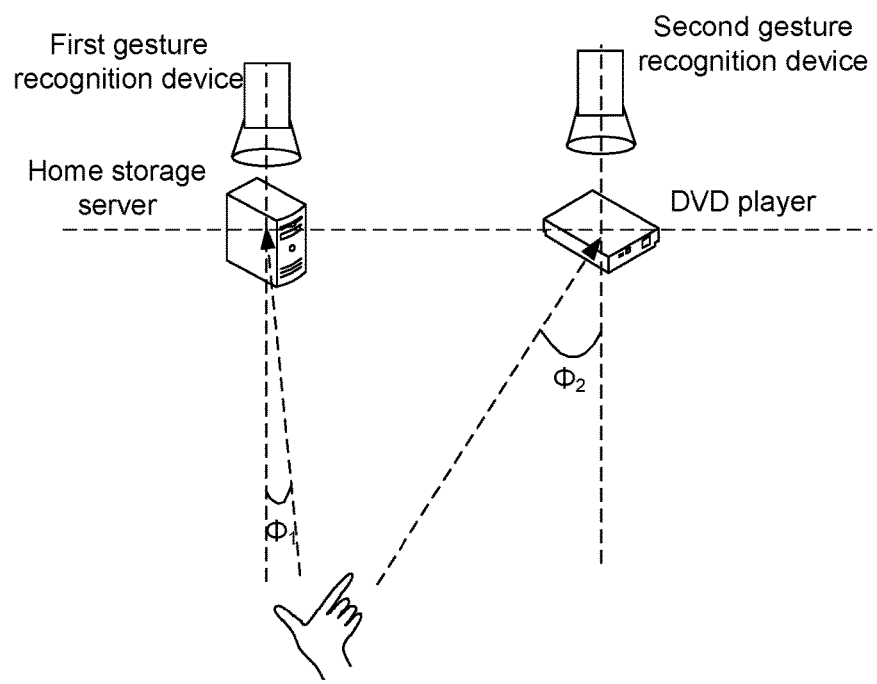
FIG. 1a is a first schematic diagram of a gesture recognition method in an embodiment of the disclosure.
FIG. 1b is a first schematic diagram of a scenario of gesture recognition in an embodiment of the disclosure.

An embodiment of the disclosure records a gesture recognition method. As shown in FIG. 1a, a first gesture recognition device determines, according to information of a recognized gesture and the position of the gesture, and the gesture recognized by a second gesture recognition device and the position of the gesture, whether to accept control by the gesture.

Information of the gesture includes at least one of the following information: the shape of the gesture, and the position of the gesture. The shape of the gesture includes at least one of the following information: a gesture number, gesture text description information, and digital graphic information. In other words, the shape of the gesture may be described by applying the gesture number, the gesture text description information, or the digital graphic information. The position of the gesture includes at least one of the following information: space coordinate parameters of the gesture, space coordinates of the gesture, gesture image data carrying depth information, and positioning parameters of the gesture relative to the absolute origin. The first gesture recognition device and the second gesture recognition device may be arranged in devices to be manipulated, and recognize the gesture by their visual recognition capabilities. Or, the first gesture recognition device and the second gesture recognition device may function as wearable devices to recognize the gesture. Therefore, the gesture includes: a computer vision recognition gesture and a wearable device gesture. Correspondingly, the position of the gesture recognized by the first gesture recognition device represents a relative position of the gesture with the first gesture recognition device, and the position of the gesture recognized by the second gesture recognition device represents a relative position of the gesture with the second gesture recognition device.

In an implementation method, when the information of the gesture only includes the shape of the gesture, the first gesture recognition device may determine, by applying the following method and according to the information of the gesture recognized by the first gesture recognition device, and the information of the gesture recognized by the second gesture recognition device, whether to accept the control by the gesture:

when determining, according to the shape of the gesture recognized by the first gesture recognition device, that the gesture is supported, the first gesture recognition device determines to accept the control by the gesture, and otherwise, determines not to accept the control by the gesture.

In an implementation method, when the information of the gesture includes the position of the gesture, the first gesture recognition device may determine, by applying the following method and according to the information of the gesture recognized by the first gesture recognition device, and the information of the gesture recognized by the second gesture recognition device, whether to accept the control by the gesture:

the first gesture recognition device determines whether the gesture is the closest to the first gesture recognition device, if yes, determines to accept the control by the gesture, and otherwise, determines not to accept the control by the gesture.

In an implementation method, when the information of the gesture includes the shape of the gesture and the position of the gesture, the first gesture recognition device may determine, by applying the following method and according to the information of the gesture recognized by the first gesture recognition device, and the information of the gesture recognized by the second gesture recognition device, whether to accept the control by the gesture:

the first gesture recognition device determines, according to the shape of the gesture recognized by the first gesture recognition device, that the gesture is supported, and the first gesture recognition device determines, according to the position of the gesture recognized by the first gesture recognition device and the position of the gesture recognized by the second gesture recognition device, whether the gesture satisfies a preset condition, if yes, determines to accept the control by the gesture, and otherwise, determines not to accept the control by the gesture.

Herein the preset condition includes at least one of the following conditions:

the distance between the gesture and the first gesture recognition device is smaller than the distance between the gesture and the second gesture recognition device; and a deviation angle of the gesture from the first gesture recognition device is smaller than a deviation angle of the gesture from the second gesture recognition device.

For example, when a user implements a gesture, both the first gesture recognition device and the second gesture recognition device acquire the gesture, and recognize the shape and the position of the gesture, respectively. The second gesture recognition device sends the shape and the position of the recognized gesture to the first gesture recognition device. The first gesture recognition device determines, according to the shape of the gesture recognized by the first gesture recognition device, that the gesture is supported (of course, the first gesture recognition device may also determine, according to the shape of the gesture recognized by the first gesture recognition device, and/or the shape of the gesture recognized by the second gesture recognition device, that the gesture is supported), and when a deviation angel of the gesture from the first gesture recognition device is smaller than a deviation angle of the gesture from the second gesture recognition device, determines to accept control by the gesture. FIG. 1b shows a schematic diagram of a scenario. The first gesture recognition device is arranged in a home storage server, and the second gesture recognition device is arranged in a Digital Versatile Disc (DVD) player. When a user implements a gesture as shown in FIG. 1b, the first gesture recognition device determines, according to the shape of the gesture recognized by the first gesture recognition device, that the gesture currently implemented by the user is supported, and determines, according to the position of the gesture recognized by the first gesture recognition device, and the position of the gesture recognized by the second gesture recognition device, that in the first gesture recognition device and the second gesture recognition device, an deviation angle φ1 of the gesture made by the user from the first gesture recognition device is smaller than a deviation angle φ2 of the gesture from the second gesture recognition device. In other words, the gesture made by the user faces the most directly to the first gesture recognition device. Therefore, the first gesture recognition device determines to accept control by the gesture made by the user. In practical application, a user will usually make a gesture in front of a device when using the gesture to control the device in view of a use habit of the user. Therefore, when determining that a deviation angel of the gesture made by the user from the first gesture recognition device is smaller than a deviation angel of the gesture made by the user from the second gesture recognition device, the first gesture recognition device determines to accept control by the gesture. Correspondingly, the first gesture recognition device determines an instruction corresponding to the recognized gesture, and controls a home storage server to execute the determined instruction. In this way, the user implements the gesture so as to control the home storage server.

In an implementation method, the first gesture recognition device publishes the information of the gesture recognized by the first gesture recognition device, so as to enable the second gesture recognition device to determine, according to the information of the gesture, and the information of the gesture recognized by the second gesture recognition device, whether to accept the control by the gesture.

Describing by taking FIG. 1b as an example, when the user implements the gesture, the first gesture recognition device publishes, in a network, information of the recognized gesture made by the user, so as to enable the second gesture recognition device to determine, according to the information of the gesture recognized by the first gesture recognition device, and information of the gesture recognized by the second gesture recognition device, whether the gesture made by the user satisfies the preset condition. In FIG. 1b, since the gesture made by the user deviates from the first gesture recognition device with the smallest angle, the second gesture recognition device determines not to accept the control by the gesture made by the user.

In an implementation method, when the first gesture recognition device fails to receive, within a preset period of time, a message indicating that the second gesture recognition device determines to accept the control by the gesture, the first gesture recognition device may further determine to accept the control by the gesture, and publish, in the network, a message indicating that the control by the gesture is accepted. Based on such consideration, when the second gesture recognition device also fails to determine to accept the control by the gesture, the gesture is necessarily implemented to the first gesture recognition device. Therefore, the first gesture recognition device needs to accept the control by the gesture;

or when the first gesture recognition device fails to receive, within a preset period of time, a message indicating that the second gesture recognition device determines to accept the control by the gesture, the first gesture recognition device may further republish the information of the recognized gesture, thus avoiding the problem that the second gesture recognition device fails to determine whether to accept the control by the gesture because the second gesture recognition device fails to receive the first gesture recognition device published-information of the recognized gesture previously, Herein the first gesture recognition device may publish the information of the recognized gesture by applying the following methods:

the first gesture recognition device publishes, in the form of a message, the information of the recognized gesture;

or publishes, in the form of a message, the information of the recognized gesture when the first gesture recognition device receives a query request. For example, the information may be published in the form of a broadcast, multicast or unicast message in the network.

An embodiment of the disclosure further records a gesture recognition method. As shown in FIG. 2, a first gesture recognition device publishes information of a gesture recognized by the first gesture recognition device, and receives information of the gesture recognized by a second gesture recognition device.

Herein information of the gesture includes at least one of the following information:

the shape of the gesture, and the position of the gesture; the shape of the gesture includes at least one of the following information: a gesture number, gesture text description information, and digital graphic information, and the position of the gesture includes at least one of the following information: space coordinate parameters of the gesture, space coordinates of the gesture, gesture image data carrying depth information, and positioning parameters of the gesture relative to the absolute origin.

The first gesture recognition device and the second gesture recognition device may be arranged in devices to be manipulated, and recognize the gesture by their visual recognition capabilities. Or, the first gesture recognition device and the second gesture recognition device may function as wearable devices to recognize the gesture. Accordingly, the gesture includes: a computer vision recognition gesture and a wearable device gesture. The gesture includes: the computer vision recognition gesture and the wearable device gesture.

In an implementation method, the first gesture recognition device further determines, according to the information of the gesture recognized by the first gesture recognition device and the information of the gesture recognized by the second gesture recognition device, whether to accept control by the gesture. Taking that the information of the gesture includes the shape of the gesture and the position of the gesture as an example, the first gesture recognition device determines, according to the shape of the gesture recognized by the first gesture recognition device, that the gesture is supported, and determines, according to the position of the gesture recognized by the first gesture recognition device, and the position of the gesture recognized by the second gesture recognition device, whether the gesture satisfies a preset condition, if yes, determines to accept the control by the gesture, and otherwise, determines not to accept the control by the gesture.

Herein the preset condition includes at least one of the following conditions:

the distance between the gesture and the first gesture recognition device is smaller than the distance between the gesture and the second gesture recognition device; and a deviation angle of the gesture from the first gesture recognition device is smaller than a deviation angle of the gesture from the second gesture recognition device.

In an implementation method, when failing to receive, within a preset period of time, a message indicating that the second gesture recognition device determines to accept the control by the gesture, the first gesture recognition device determines to accept the control by the gesture, and publishes a message indicating that the control by the gesture is accepted; or when failing to receive, within a preset period of time, a message indicating that the second gesture recognition device determines to accept the control by the gesture, the first gesture recognition device republishes the information of the gesture recognized by the first gesture recognition device. Here, a method for publishing the information includes that: the information is published in the form of a unicast, multicast or broadcast message in a network.

In an implementation method, when the first gesture recognition device determines to accept the control by the gesture, the first gesture recognition device may further publish, in a network, a message indicating that the control by the gesture is accepted. In this way, the second gesture recognition device may not perform an operation of determining whether to accept the control by the gesture.

In an implementation method, the first gesture recognition device may publish, by applying any one of the following methods, the information of the gesture recognized by the first gesture recognition device:

the first gesture recognition device publishes, in the form of a message, the information of the gesture recognized by the first gesture recognition device;

or when the first gesture recognition device receives a query request, publishes, in the form of a message, the information of the gesture recognized by the first gesture recognition device. For example, the information may be published in the form of a broadcast, multicast or unicast message in the network.

An embodiment of the disclosure further records a computer storage medium. The computer storage medium stores a computer executable instruction. The computer executable instruction is used for executing the gesture recognition method as shown in FIG. 1 or FIG. 2.

An embodiment of the disclosure further records a first gesture recognition device. As shown in FIG. 3, the first gesture recognition device includes:

a first recognizing unit 31 configured to recognize information of a gesture; and a first determining unit 32 configured to determine, according to the information of the gesture recognized by the first recognizing unit 31 and information of the gesture recognized by a second gesture recognition device, whether to accept control by the gesture.

Herein, the information of the gesture includes at least one of the following information: the shape of the gesture, and the position of the gesture, Herein, the first determining unit 32 is further configured to determine, according to the shape of the gesture recognized by the first recognizing unit 31, that the gesture is supported, and determine, according to the position of the gesture recognized by the first recognizing unit 31 and the position of the gesture recognized by the second gesture recognition device, whether the gesture satisfies a preset condition, if yes, determine to accept the control by the gesture, and otherwise, determine not to accept the control by the gesture.

Herein, the preset condition includes at least one of the following conditions:

the distance between the gesture and the gesture recognition device is smaller than the distance between the gesture and the second gesture recognition device; and a deviation angle of the gesture from the gesture recognition device is smaller than a deviation angle of the gesture from the second gesture recognition device.

Herein, the gesture recognition device further includes:

a first publishing unit 33 configured to publish, in a network, the information of the gesture recognized by the first recognizing unit 31.

Herein, the first publishing unit 33 is further configured to publish, in the form of a message, the gesture recognized by the first recognizing unit and the position of the gesture;

or publish, in the form of a message, the gesture recognized by the first recognizing unit 31 and the position of the gesture when receiving a query request.

Herein, the first determining unit 32 is further configured to, when the first publishing unit 33 fails to receive, within a preset period of time, a message indicating that the second gesture recognition device determines to accept the control by the gesture, determine to accept the control by the gesture, and trigger the first publishing unit 33 to publish a message indicating that the control by the gesture is accepted; or when the first publishing unit 33 fails to receive, within a preset period of time, a message indicating that the second gesture recognition device determines to accept the control by the gesture, trigger the first publishing unit 33 to republish the information of the gesture recognized by the first recognizing unit 31.

Herein, the first publishing unit 33 is further configured to, when the first determining unit 32 determines to accept the control by the gesture, publish a message indicating that the control by the gesture is accepted.

Herein, the shape of the gesture includes at least one of the following information: a gesture number, gesture text description information, and digital graphic information.

Herein, the position of the gesture includes at least one of the following information: space coordinate parameters of the gesture, space coordinates of the gesture, gesture image data carrying depth information, and positioning parameters of the gesture relative to the absolute origin.

Herein, the gesture includes: a computer vision recognition gesture and a wearable device gesture.

When the gesture recognition device is arranged in a device to be manipulated, the first recognizing unit 31 may be implemented by a camera having a visual acquisition capability. When the gesture recognition device functions as a wearable device, the first recognizing unit 31 may be implemented by a gravity sensor or a gyroscope, the first determining unit 32 may be implemented by a Central Processing Unit (CPU), a Digital Signal Processor (DSP) or a Field Programmable Gate Array (FPGA) in the gesture recognition device, and the first publishing unit 33 may be implemented by a functional chip supporting a network protocol such as Institute of Electrical and Electronics Engineers (IEEE) 802.11b/g/n, or IEEE 802.3 in the gesture recognition device.

An embodiment of the disclosure further records a first gesture recognition device. As shown in FIG. 4, the first gesture recognition device includes:

a second recognizing unit 41 and a second publishing unit 42, in which:

the second publishing unit 42 is configured to publish, in a network, information of a gesture recognized by the second recognizing unit 41, and receive information of the gesture provided by a second gesture recognition device.

Herein, the gesture recognition device further includes:

a second determining unit 43 configured to determine, according to the information of the gesture recognized by the second recognizing unit 41 and the information of the gesture recognized by the second gesture recognition device, whether to accept control by the gesture.

Herein, information of the gesture includes at least one of the following information: the shape of the gesture, and the position of the gesture.

Herein, the second determining unit 43 is further configured to, when the information of the gesture includes the shape of the gesture and the position of the gesture, determine, according to the shape of the gesture recognized by the second recognizing unit 41, that the gesture is supported, and when determining, according to the position of the gesture recognized by the second recognizing unit 41, and the position of the gesture recognized by the second gesture recognition device, that the gesture satisfies a preset condition, determine to accept the control by the gesture.

Herein, the preset condition includes at least one of the following conditions:

the distance between the gesture and the gesture recognition device is smaller than the distance between the gesture and the second gesture recognition device; and a deviation angle of the gesture from the gesture recognition device is smaller than a deviation angle of the gesture from the second gesture recognition device.

Herein, the second determining unit 43 is further configured to, when failing to receive, within a preset period of time, a message indicating that the second gesture recognition device determines to accept the control by the gesture, determine to accept the control by the gesture, and publish, in the network, a message indicating that the control by the gesture is accepted; or, when failing to receive, within a preset period of time, a message indicating that the second gesture recognition device determines to accept the control by the gesture, republish, in the network, the information of the gesture recognized by the first gesture recognition device.

Herein, the second publishing unit 42 is further configured to, when the second determining unit 43 determines to accept the control by the gesture, publish, in the network, a message indicating that the control by the gesture is accepted.

Herein, the second publishing unit 42 is further configured to publish, in the form of a broadcast, multicast, or unicast message, the information of the gesture recognized by the second recognizing unit 41; or when the second publishing unit 42 receives a query request, publish, in the form of a broadcast, multicast, or unicast message, the information of the gesture recognized by the second recognizing unit 41.

Herein, the shape of the gesture includes at least one of the following information: a gesture number, gesture text description information, and digital graphic information.

Herein, the position of the gesture includes at least one of the following information: space coordinate parameters of the gesture, space coordinates of the gesture, gesture image data carrying depth information, and positioning parameters of the gesture relative to the absolute origin.

Herein, the gesture includes: a computer vision recognition gesture and a wearable device gesture.

When the gesture recognition device is arranged in a device to be manipulated, the second recognizing unit 41 may be implemented by a camera having a visual acquisition capability. When the gesture recognition device functions as a wearable device, the second recognizing unit 41 may be implemented by a gravity sensor or a gyroscope, the second determining unit 43 may be implemented by a CPU, a DSP or an FPGA in the gesture recognition device, and the second publishing unit 42 may be implemented by a functional chip supporting a network protocol such as IEEE 802.11b/g/n, or IEEE 802.3 in the gesture recognition device.

An embodiment of the disclosure further records a gesture recognition system, including the first gesture recognition device as shown in FIG. 3, and/or the first gesture recognition device as shown in FIG. 4. It needs to be noted that a first gesture recognition device included in the system may be arranged on a single device, and the gesture recognition methods as shown in FIG. 1 and FIG. 2 are implemented by the single device. The first gesture recognition device included in the system may be also arranged on a plurality of devices, and the gesture recognition methods as shown in FIG. 1 and FIG. 2 are implemented by the plurality of devices.

Figure 5:
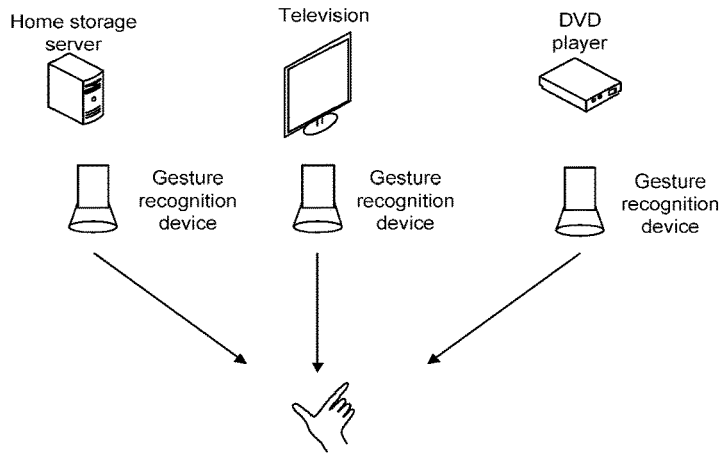
FIG. 5 is a second schematic diagram of a scenario of gesture recognition in an embodiment of the disclosure.

Description will be provided below in combination with a use scenario. FIG. 5 is the second schematic diagram of a scenario of gesture recognition in an embodiment of the disclosure. FIG. 5 shows three devices, i.e. a television, a DVD player and a home storage server respectively, wherein the television, the television, the DVD player and the home storage server are provided with a gesture recognition device, respectively. The gesture recognition devices use cameras to recognize gestures. In order to facilitate description, each gesture recognition device is provided with the same gesture recognition capability, and a capability of measuring the position of a recognized gesture.

A network interface (corresponding to a network unit) is provided on the gesture recognition devices. For example, the network interface can support IEEE 802.11b/g/n or IEEE 802.3, so that the network interface can be connected to a network supporting an Internet Protocol (IP). Each gesture recognition device performs message interaction with gesture recognition devices in other devices, and processes or transfers an operation instruction.

Capabilities of the gesture recognition devices, including mutual discovery, connection, as well as transmission and reception of a message on a network, may be implemented by using a related technology, such as an UPnP technology, and may be also implemented by a multicast Domain Name System (mDNS), or a DNS-based Service Discovery (DNS-SD) technology. Such technologies are applied in the IP network, use a unicast or multicast query method, respond to a query according to a predefined message format, and provide function invoking. For example, the UPnP technology specifies a method for a media display device (e.g. the television), or a server (e.g. the DVD player or the home storage server) to respond to a query and invoking functions that are provided.

In an implementation method, a gesture recognition device includes a camera (corresponding to a recognizing unit in the gesture recognition device) having an image and video acquisition capability so as to acquire a gesture, and recognize the position of the gesture by using an infrared distance measurement method.

In another implementation method, the gesture recognition device may be also a wearable device, such as a ring type device worn on a hand or a watch type device worn on an arm. Such a wearable device may recognize an action of a finger and an arm of a user by means of a gyroscope, a gravity sensor and so on and also has a network function. The wearable device may perform information interaction with the above devices to be manipulated, such as the television, the DVD player, and the home storage server, via a network unit arranged in the wearable device.

In the present embodiment, the gesture recognition device may recognize a gesture within a visual range thereof. For example, an image may be acquired by the camera, the position may be measured by applying an infrared method in a three-dimensional space, and information of the image is analyzed in the acquired image. The gesture recognition device also measures the distance of the gesture, such as a finger gesture, a palm gesture and an arm gesture, and stores the same with information of the gesture.

In the embodiment, when recognizing the gesture, the gesture recognition device in the television, the DVD player, or the home storage server sends a message by a multicast method. The message includes:

a unique identifier of the gesture recognition device, such as a network address;

a number of the recognized gesture, representing the shape of the gesture, e.g. 1 represents that 5 fingers are opened, 2 represents 2 fingers, 10 represents a first, 20 represents waving of an arm and so on; and position information of the gesture, herein the position information may apply forms including space coordinates, gesture image data having depth information, or positioning parameters of the gesture relative to the absolute origin and so on.

The message may further include a gesture parameter, such as a duration of the gesture.

Figure 6:
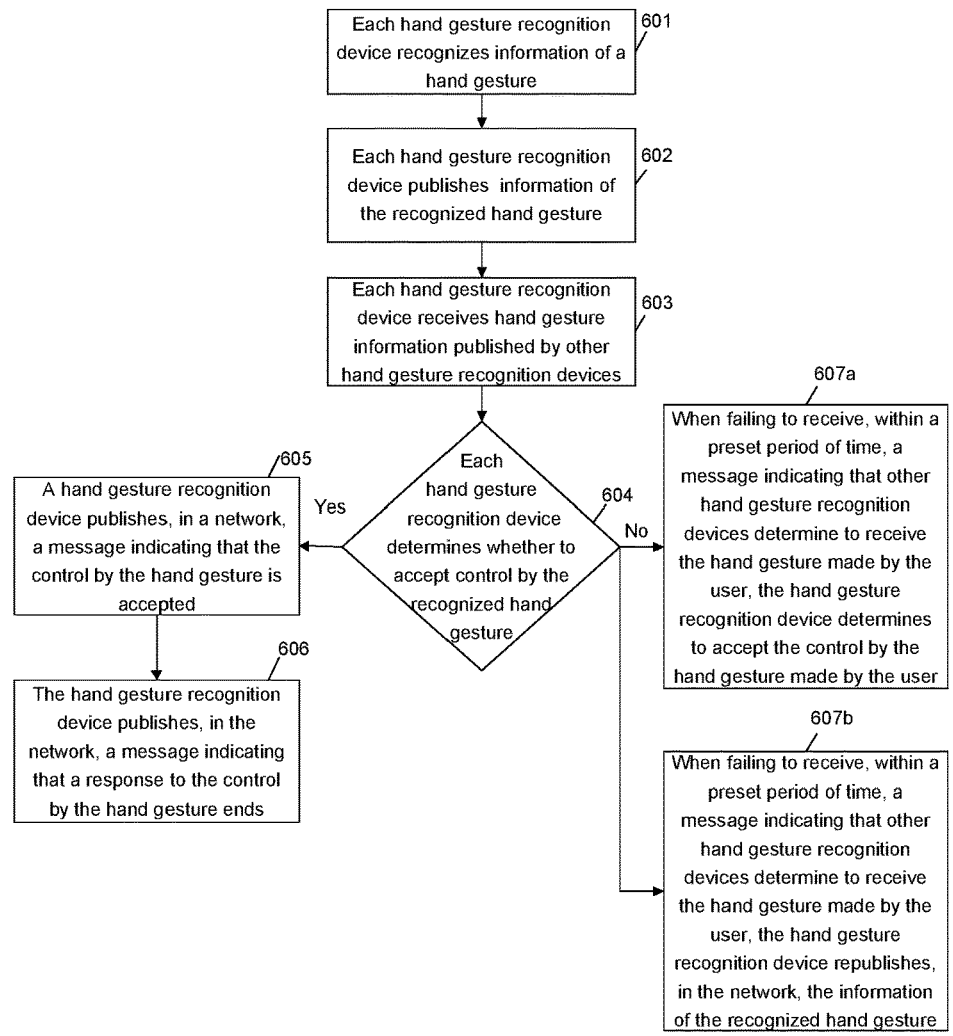
FIG. 6 is a flowchart of gesture recognition in an embodiment of the disclosure.

FIG. 6 is a flowchart of gesture recognition in an embodiment of the disclosure. The flow chart as shown in FIG. 6 refers to the device in FIG. 5. As shown in FIG. 6, the gesture recognition includes the following steps.

Step 601: each gesture recognition device recognizes information of a gesture.

The gesture recognition devices recognize the gesture independently, and a recognition operation includes recognition of the shape of the gesture, and one or more fingers and arms, and further includes measurement of the positions of a finger and an arm.

Step 602: each gesture recognition device publishes information of the recognized gesture.

In the present embodiment, the information of the gesture includes the shape of the gesture and the position of the gesture.

The shape of the gesture and the position of the gesture may be published in a network by means of multicast and so on.

Step 603: each gesture recognition device receives gesture information published by other gesture recognition devices.

Taking a gesture recognition device in a television as an example, the gesture recognition device in the television recognizes the shape and the position of a gesture made by a user, and receives the shape and the position of the gesture made by the user and recognized by a gesture recognition device in a DVD player, and the shape and the position of the gesture made by the user and recognized by a gesture recognition device in a home storage server. In other words, when the user implements the gesture, the three gesture recognition devices in the three devices in FIG. 5 recognize the shapes and the positions of the gesture of the user respectively, and publish the shape and the position of the recognized gesture through the network.

After receiving information of the gesture, a gesture recognition device needs to store the received information of the gesture, wherein a timer may be also arranged in the gesture recognition device so that the received information of the gesture is stored for a preset period of time, and the stored information of the gesture may be discarded after the preset period of time.

Step 604: each gesture recognition device determines whether to accept control by the recognized gesture, if yes, Step 605 to Step 606 are executed, and otherwise, Step 607*a* to Step 607*b* is executed.

Taking processing of the gesture recognition device in the television as an example, the gesture recognition device in the television recognizes the shape and the position of the gesture made by the user, and determines, according to the shape and the position recognized by the gesture recognition device in the DVD player and implemented by the user, and the shape and the position recognized by the gesture recognition device in the home storage server and implemented by the user, whether to accept the control by the gesture made by the user. Referring to FIG. 5, the gesture recognition device in the television is able to determine that the gesture made by the user has the smallest deviation angle from the television (and the gesture recognition device in the television), thus the gesture recognition device in the television determines to accept the control by the gesture made by the user.

Step 605: the gesture recognition device publishes, in the network, a message indicating that the control by the gesture is accepted.

The gesture recognition device determines, according to the gesture made by the user, an instruction corresponding to the gesture made by the user, and controls a corresponding device to execute the instruction.

Step 606: the gesture recognition device publishes, in the network, a message indicating that a response to the control by the gesture ends.

Step 607*a*: when failing to receive, within a preset period of time, a message indicating that other gesture recognition devices determine to receive the gesture made by the user, the gesture recognition device determines to accept the control by the gesture made by the user.

Accordingly, when determining to accept the control by the gesture made by the user, the gesture recognition device may further publish, in the network, a message indicating that the control by the gesture made by the user is accepted.

Step 607*b*: when failing to receive, within a preset period of time, a message indicating that other gesture recognition devices determine to receive the gesture made by the user, the gesture recognition device republishes, in the network, information of the recognized gesture.

Figure 7:
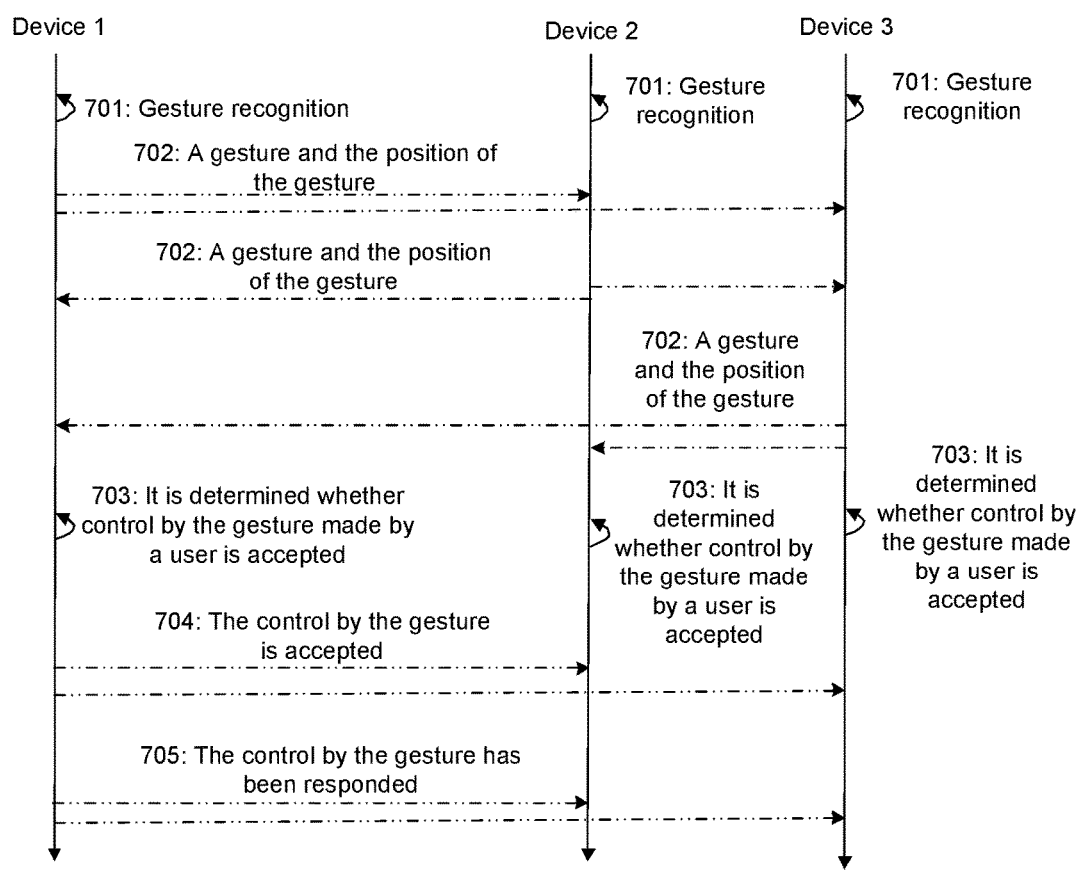
FIG. 7 is a schematic diagram of message interaction between gesture recognition devices in an embodiment of the disclosure.

The gesture recognition flow will be described below in combination with a schematic diagram of message interaction between gesture recognition devices in FIG. 7. As shown in FIG. 7, the flow includes the following steps.

Step 701: gesture recognition devices in device 1 to device 3 recognize a gesture action performed by a user.

A gesture recognition device may recognize, through a camera, the gesture made by the user. Of course, the gesture recognition device itself may be also a wearable device (e.g. the user wears wearable devices corresponding to devices to be manipulated at the same time), to recognize the gesture made by the user.

Step 702: the gesture recognition devices in device 1 to device 3 publish, in a network, the recognized gesture and the position of the gesture.

Thus, each gesture recognition device receives the gesture recognized by other gesture recognition devices and the position of the gesture.

Step 703: the gesture recognition devices in device 1 to device 3 determine whether to accept control by the gesture made by the user.

Step 704: a gesture recognition device that determines to accept the control by the gesture publishes a message of determining to accept the control by the gesture.

Provided that the gesture recognition device in device 1 determines to accept the control by the gesture, the gesture recognition device in device 1 publishes, in the network, a message indicating that device 1 accepts the control by the gesture.

Step 705: the gesture recognition device that determines to accept the control by the gesture publishes, in a network after controlling the corresponding device to respond to the control by the gesture, a message indicating that the control by the gesture has been responded.

After controlling device 1 to respond to the control by the gesture, the gesture recognition device in device 1 publishes, in the network, a message indicating that device 1 has responded to the control by the gesture.

It may be learned that a target manipulated device of a gesture made by a user is determined through the embodiments of the disclosure in a scenario with a plurality of devices, thus manipulating the target manipulated device.

In the embodiments above, the television, the DVD player and the storage server serve as manipulated devices, and manipulated devices in the disclosure are not limited to such devices as mentioned in the embodiments. A computer, a stereo, a loudspeaker box, a projector, a set top box and so on may also function as manipulated devices, and even other industrial devices, such as a car, a machine tool, and a steamer may be also manipulated by a visual recognition and discovery control device.

In the embodiments above, a camera of a gesture recognition device may be of various specifications. For example, the camera may have a fixed focal length or a variable focal length, may have rotation spaces in various angles including upward, downward, leftward and rightward angles, or only supports a left angle and a right angle, needs to be configured with only one camera, and has various capabilities described in the embodiments. When the gesture recognition device recognizes the position of a gesture, an infrared laser may be used, or lights of other wavebands may be also used. Of course, a distance may be also calculated and measured by using 3 cameras, or the position of the recognized gesture is determined by using more than 3 cameras according to a weighting adjustment method.

For clarity, not all common features of the devices are shown and described in the embodiments of the disclosure. Of course, it should be understood that during the development of any actual device, it is necessary to make decisions of specific implementation methods so as to achieve specific purposes of developers, e.g. to meet constraints related to applications and services. These specific purposes change with different implementation methods and different developers. Moreover, it should be understood that such development work is complicated and time-consuming. However, even so, the technical work performed is regular for those of ordinary skill in the art under the inspiration of the content disclosed by the embodiments of the disclosure.

According to the topics described here, various types of operation systems, computer platforms, computer programs, and/or general machines can be used to fabricate, operate and/or execute various components, systems, devices, processing steps and/or data structures. Besides, it will be understood by those of ordinary skill in the art that devices which are not general can be also used without departing from the scope and spirit essence of the inventive concept disclosed here, wherein the method is executed by a computer, a device or a machine, and the method can be stored as machine-readable instructions which can be stored on a determined medium, such as a computer storage device, including, but not limited to a Read Only Memory (ROM) (such as an ROM, a flash memory, and a transfer apparatus), a magnetic storage medium (such as a magnetic tape and a magnetic driver), an optical storage medium (such as Compact Disc ROM (CD-ROM), a DVD-ROM, a paper card, a paper tape and so on) and other familiar types of program memories. Besides, it should be realized that the method can be executed by a human operator by choosing a software tool without creative judgment.

The embodiments above are applicable to, in a network-related manner, a Internet Protocol (IP) network supported by a communication network based on IEEE 802.3, IEEE 802.11b/g/n, a power line, a cable, a Public Switched Telephone Network (PSTN), a $3^{rd}$ Generation Partnership Project (3GPP) network, a 3GPP2 network and so on. Operating systems of various devices are applicable a UNIX operating system, a WINDOWS operating system, an ANDDROID operating system, an IOS operating system, and an consumer-oriented interface is applicable to a JAVA language interface and so on.

In should be understood in several embodiments provided by the disclosure that the disclosed devices and methods may be implemented by other methods, and the embodiments of devices described above are only schematic. For example, the division of the units is only division of logical functions, and there may be additional division methods in practical implementation. For example, multiple units or components may be combined or may be integrated to another system, or some features may be omitted or not performed. Besides, coupling, direct coupling or communication connection between the displayed or discussed components may be indirect coupling or communication connection of the devices or units through some interfaces, devices or units, and may be electrical, mechanical or other forms.

The units described as separate components may be or may be also not physically separate, and components displayed as units may be or may be also not physical units. That is, the components may be located at the same place or may be distributed on multiple network units. Some or all of the units may be selected to achieve the purposes of the solutions of the embodiments as needed.

In addition, the functional units according to the embodiments of the disclosure may be integrated in one processing unit, or each of the units may function as a unit separately, or two or more units may be integrated in one unit. The integrated unit may be implemented by applying a form of hardware, and may be also implemented by applying a form of hardware and software functional units.

Those of ordinary skill in the art may understand that all or some steps for implementing the embodiments of the methods may be completed by related hardware instructed by a program. The program may be stored in a computer readable storage medium. When executed, the problem executes steps including the method embodiments above, and the storage medium includes various media that can store a program code, such as a mobile storage device, an ROM, and a magnetic disk, an optical disk, or, when implemented in the form of a software functional module, and sold or used as an independent product, the integrated unit of the disclosure may be stored in a computer readable storage medium. Based on such understanding, the technical solutions of the embodiments of the disclosure essentially, or parts of the technical solutions contributing to the traditional art may be represented in the form of a software product. The computer software product is stored in a storage medium, including some instructions enabling a computer device (which may be a personal computer, a server, a network device, or the like) to perform all or some steps of the methods according to the embodiments of the disclosure. The above storage medium includes various media which may store a program code, such as a Universal Serial Bus (USB) disk, an ROM, a magnetic disk or an optical disk and so on.

What are described above are only specific embodiments of the disclosure, and the protection scope of the disclosure is not limited thereto. Any changes or replacements that may be easily thought of by those skilled in the art within the technical scope disclosed by the disclosure should be covered in the protection scope of the disclosure. Therefore, the protection scope of the disclosure should be subject to the protection scope of the claims.

What is claimed is:

1. A gesture recognition method, comprising:
    determining, by a first gesture recognition device, according to information of a gesture recognized by the first gesture recognition device and information of the gesture recognized by a second gesture recognition device (s), whether to accept control by the gesture;
    wherein the information of the gesture comprises at least one of the following information: the shape of the gesture or the position of the gesture;
    wherein, when the information of the gesture comprises the shape of the gesture and the position of the gesture, determining, by the first gesture recognition device, according to the information of the gesture recognized by the first gesture recognition device and the information of the gesture recognized by the second gesture recognition device(s), whether to accept the control by the gesture comprises:
        determining, by the first gesture recognition device, according to the shape of the gesture recognized by the first gesture recognition device, that the gesture is supported, and determining, according to the position of the gesture recognized by the first gesture recognition device and the position of the gesture recognized by the second gesture recognition device (s), whether the gesture satisfies a preset condition; if yes, determining to accept the control by the gesture, and otherwise, determining not to accept the control by the gesture;
    wherein the preset condition comprises at least one of the following conditions:
        the distance between the gesture and the first gesture recognition device is smaller than the distance between the gesture and the second gesture recognition device(s); or
        a deviation angle of the gesture from the first gesture recognition device is smaller than a deviation angle of the gesture from the second gesture recognition device(s).

2. The gesture recognition method according to claim 1, further comprising:
    publishing, by the first gesture recognition device, the information of the gesture recognized by the first gesture recognition device.

3. The gesture recognition method according to claim 2, wherein publishing, by the first gesture recognition device, the information of the gesture recognized by the first gesture recognition device comprises:

publishing, in the form of a message, by the first gesture recognition device, the information of the gesture recognized by the first gesture recognition device; or publishing, in the form of a message, by the first gesture recognition device when receiving a query request, the information of the gesture recognized by the first gesture recognition device.

4. The gesture recognition method according to claim 1, further comprising:

when the first gesture recognition device fails to receive, within a preset period of time, a message indicating that the second gesture recognition device(s) determines to accept the control by the gesture, determining, by the first gesture recognition device, to accept the control by the gesture, and publishing a message indicating that the control by the gesture is accepted; or when the first gesture recognition device fails to receive, within a preset period of time, the message indicating that the second gesture recognition device(s) determines to accept the control by the gesture, republishing, by the first gesture recognition device, the information of the gesture recognized by the first gesture recognition device.

5. The gesture recognition method according to claim 1, further comprising: when the first gesture recognition device determines to accept the control by the gesture, publishing, by the first gesture recognition device, a message indicating that the control by the gesture is accepted.

6. The gesture recognition method according to claim 1, wherein the shape of the gesture comprises at least one of the following information: a gesture number, gesture text description information, and or digital graphic information; and wherein the position of the gesture comprises at least one of the following information: space coordinate parameters of the gesture, space coordinates of the gesture, gesture image data carrying depth information, or positioning parameters of the gesture relative to an absolute origin.

7. The gesture recognition method according to claim 1, wherein the gesture comprises: a computer vision recognition gesture and a wearable device gesture.

8. A non-transitory computer storage medium having stored therein computer executable instructions used for executing the gesture recognition method according to claim 1.

9. A gesture recognition method, comprising:

publishing, by a first gesture recognition device, information of a gesture recognized by the first gesture recognition device, and receiving information of the gesture recognized by a second gesture recognition device(s);

determining, by the first gesture recognition device, according to the information of the gesture recognized by the first gesture recognition device and the information of the gesture recognized by the second gesture recognition device(s), whether to accept control by the gesture;

wherein the information of the gesture comprises at least one of the following information: the shape of the gesture or the position of the gesture;

wherein, when the information of the gesture comprises the shape of the gesture and the position of the gesture, determining, by the first gesture recognition device, according to the information of the gesture recognized by the first gesture recognition device and the information of the gesture recognized by the second gesture recognition device(s), whether to accept the control by the gesture comprises:

determining, by the first gesture recognition device, according to the shape of the gesture recognized by the first gesture recognition device, that the gesture is supported, and determining, according to the position of the gesture recognized by the first gesture recognition device, and the position of the gesture recognized by the second gesture recognition device (s), whether the gesture satisfies a preset condition; if yes, determining to accept the control by the gesture, and otherwise, determining not to accept the control by the gesture;

wherein the preset condition comprises at least one of the following conditions:

the distance between the gesture and the first gesture recognition device is smaller than the distance between the gesture and the second gesture recognition device(s); or a deviation angle of the gesture from the first gesture recognition device is smaller than a deviation angle of the gesture from the second gesture recognition device(s).

10. The gesture recognition method according to claim 9, further comprising:

when the first gesture recognition device fails to receive, within a preset period of time, a message indicating that the second gesture recognition device(s) determines to accept the control by the gesture, determining, by the first gesture recognition device, to accept the control by the gesture, and publishing a message indicating that the control by the gesture is accepted; or when the first gesture recognition device fails to receive, within a preset period of time, the message indicating that the second gesture recognition device(s) determines to accept the control by the gesture, republishing, by the first gesture recognition device, the information of the gesture recognized by the first gesture recognition device.

11. The gesture recognition method according to claim 9, further comprising: when the first gesture recognition device determines to accept the control by the gesture, publishing, by the first gesture recognition device, a message indicating that the control by the gesture is accepted.

12. The gesture recognition method according to claim 9, wherein publishing, by the first gesture recognition device, the information of the gesture recognized by the first gesture recognition device comprises:

publishing, in the form of a message, by the first gesture recognition device, the information of the gesture recognized by the first gesture recognition device; or publishing, in the form of a message, by the first gesture recognition device when receiving a query request, the information of the gesture recognized by the first gesture recognition device.

13. The gesture recognition method according to claim 9, wherein the shape of the gesture comprises at least one of the following information: a gesture number, gesture text description information, or digital graphic information; and wherein the position of the gesture comprises at least one of the following information: space coordinate parameters of the gesture, space coordinates of the gesture, gesture image data carrying depth information, or positioning parameters of the gesture relative to an absolute origin.

14. The gesture recognition method according to claim 9, wherein the gesture comprises: a computer vision recognition gesture and a wearable device gesture.

15. A non-transitory computer storage medium having stored therein computer executable instructions used for executing the gesture recognition method according to claim 9.

* * * * *